(12) United States Patent
Youngblood

(10) Patent No.: US 10,518,878 B2
(45) Date of Patent: Dec. 31, 2019

(54) MULTI-ROTOR AIRCRAFT CONTROL

(71) Applicant: Curtis Youngblood, Hearne, TX (US)

(72) Inventor: Curtis Youngblood, Hearne, TX (US)

( * ) Notice: Subject to any disclaimer, the term of this patent is extended or adjusted under 35 U.S.C. 154(b) by 747 days.

(21) Appl. No.: 15/287,125

(22) Filed: Oct. 6, 2016

(65) Prior Publication Data
US 2017/0297705 A1  Oct. 19, 2017

Related U.S. Application Data

(62) Division of application No. 14/200,342, filed on Mar. 7, 2014, now Pat. No. 9,499,263.

(60) Provisional application No. 61/782,747, filed on Mar. 14, 2013, provisional application No. 61/791,230, filed on Mar. 15, 2013.

(51) Int. Cl.
*B64C 39/02* (2006.01)
*A63H 27/00* (2006.01)

(52) U.S. Cl.
CPC ........... *B64C 39/024* (2013.01); *A63H 27/12* (2013.01); *B64C 2201/027* (2013.01); *B64C 2201/042* (2013.01); *B64C 2201/146* (2013.01)

(58) Field of Classification Search
CPC ............. B64C 39/02; B64C 2201/027; B64C 2201/042; B64C 2201/146; A63H 27/12
See application file for complete search history.

(56) References Cited

PUBLICATIONS

J. Borenstein, "The HoverBot—An Electrically Powered Flying Robot," (Year: 1992).*

* cited by examiner

*Primary Examiner* — Peter D Nolan
(74) *Attorney, Agent, or Firm* — Douglas Baldwin

(57) ABSTRACT

Flight control method and apparatus for multi-rotor aircraft that is programmed for varied control commands and conditions in the control of the aircraft in flight.

13 Claims, 12 Drawing Sheets

MULTI-ROTOR AIRCRAFT CONTROL

CROSS REFERENCE TO RELATED APPLICATIONS

This application is a Divisional application of application Ser. No. 14/200,342 filed Mar. 7, 2014, which application claims benefit of Provisional Application Ser. No. 61/782,747 filed Mar. 14, 2013 and 61/791,230 filed Mar. 15, 2013. The contents and disclosures of each of these applications are incorporated herein by reference in their entirety for all purposes.

BACKGROUND

Field

This invention relates to multi-rotor aircraft such as quad-rotors that are configured as an H frame and to control units and methods for the craft.

Background

Quad Rotors or Quad rotor helicopters, classified as rotorcraft, are popular particularly in hobby craft for their stability and versatility of radio control (RC). Conventional quad-rotors (including multi rotors with 4, 6 or 8 rotors) have 4-8 rotor legs extending from a central member (in a cross configuration or structure) to which the rotor is attached. They generally have separate motors for each rotor. Each propeller is connected to the motor through reduction gears or directly to the motor shaft. All the propellers axes of rotation are fixed and parallel. Furthermore, they have fixed-pitch blades and their air flow point downwards (to get an upward lift). Thus, the structure is quite rigid and only the propeller speeds can be varied. Pairs of propellers rotate counter-clockwise, while other propellers rotate clockwise.

This configuration of opposite rotational direction and the opposing torques removes the need for a tail rotor that is needed in the standard helicopter structure). Conventional quad rotors generally use fixed pitched propellers. Two will spin clockwise and the other two will spin counter clockwise. By precisely and accurately spinning these four propellers at different speeds, all the common directional movements of a standard helicopter are attainable—hover, forward/backward movement, left/right movement, and yaw (turn rate) movement.

Some multi rotor design have as little as 3 propellers arranged in a triangle configuration and some up to six arranged in a hexagonal configuration and even eight (Octocopters). Because of their fixed propeller design multi-rotors, aircraft generally cannot sustain inverted flight or achieve advanced aerobatic containing "inverted" lift elements. The present invention overcomes many of the restriction of fixed pitch multi rotor craft.

SUMMARY

A multi-rotor aircraft comprising a hollow center boom from which extends three or more leg booms, disposed generally perpendicular to the center boom, and on which is mounted rotor bases that have rotor rotation means and rotor blades. In another aspect the invention is programmed means for control of the craft described above and methods of control of the craft in flight. Other aspects of the invention are described in the Detailed Description and claims.

DESCRIPTION OF THE FIGURES

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 8 A is a schematic of functions of a programmed control mode of the invention.

Figure 1:
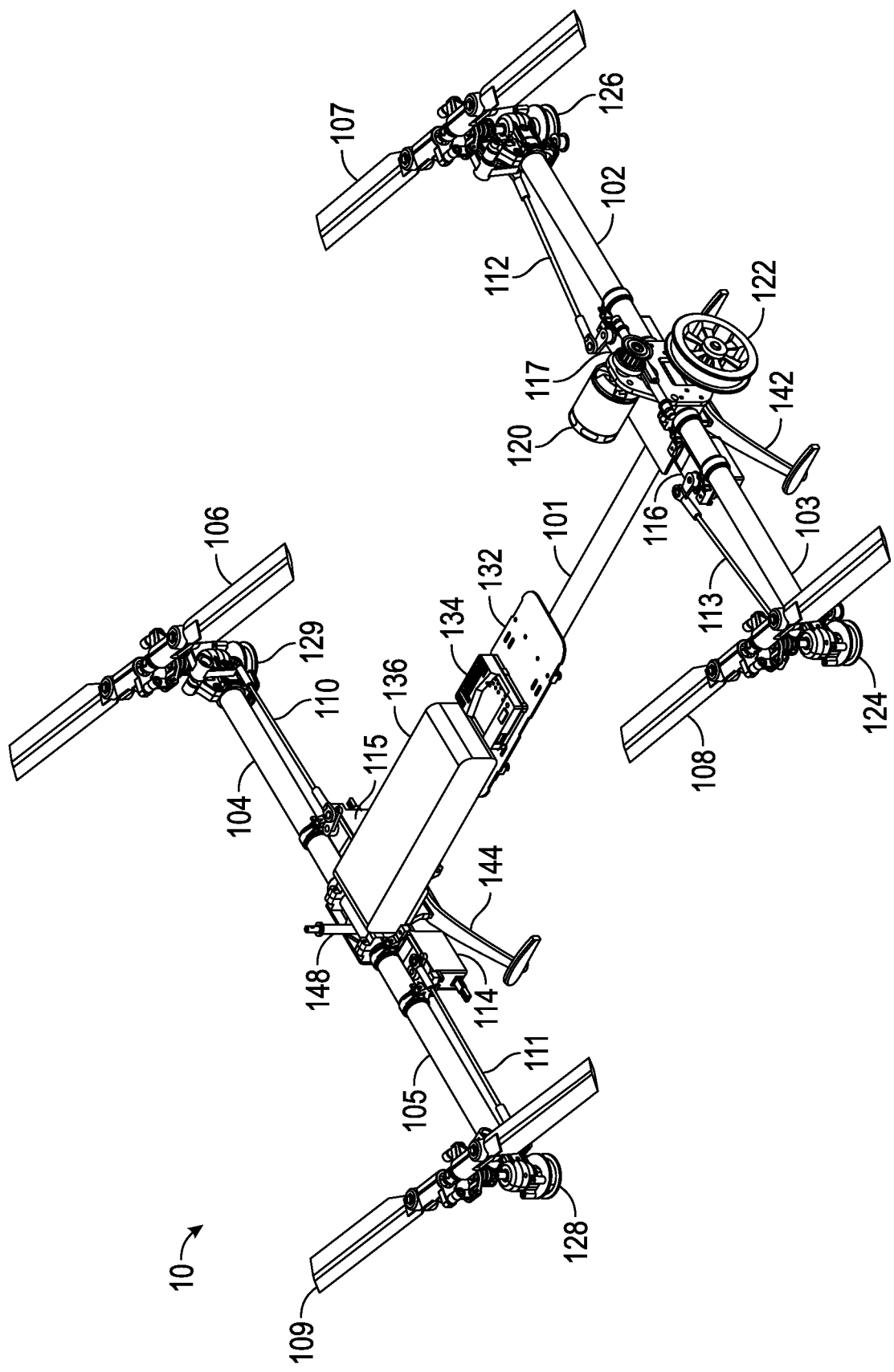
FIG. 1 is a perspective view of an embodiment of the multi-rotor of the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION

This invention is improved multi-rotor aircraft(s) and control systems to control flight performance of the aircraft.

The multi-rotor aircraft of embodiments of the present invention is constructed in an "H" frame configuration having a hollow central boom from which rotor legs extend perpendicular to the central boom in a plane horizontal to the central boom or tilted upward or downward from the horizontal plane of the boom. Rotors are disposed perpendicular to and upward from the rotor legs. Conventional multi-rotors are configured in a cross arrangement with legs that support the rotors spread from a single central member—a cross or "X" design.

Most current multi-rotors have a separate motor and a fixed propeller (prop) on each leg that extends from a central member. For control they vary the motor (and therefore rotor blade rpm) to change lift and torque. This works but it limits lift to one direction, so it does not allow inverted flying. They can "jump" through inverted, where they pulse the motors and fall as the machine flips all the way past inverted back to right side up. But they can do no inverted lift. Some special Multi rotors can reverse motors in air to achieve reverse lift, but very inefficiently.

The "H" frame configuration of embodiments of the present invention employs a different method. Instead of varying motor rpm to change lift and torque, the rotor blade pitch is changed (in some embodiments later described it is possible to vary both rpm and blade pitch). This has the added advantage of giving inverted lift at least equal to right side up lift. This can be accomplished with one central motor or with separate motors for each rotor. Multiple motors need to sync together to keep a constant rpm. The single motor in an embodiment of the present invention is the easiest way to keep all rotors at the same rpm. The mechanics are in an "H" configuration has many advantages.

To better understand the flight characteristics and concepts of this invention and to aid in defining programmable control solutions to flight control problems, the following definitions define the terms used herein:
1. "Longitudinal axis" is an axis centered between (or along) the rotors lying in the plane of the rotors and in a direction determined to be "normal" for forward flight.
2. "Lateral axis" is an axis also centered between (or along) the rotors, lying in the plane of the rotors, and perpendicular to the forward flight.
3. "Yaw" is rotation about an axis perpendicular to the plane containing the rotors.
4. "Roll" is rotation about the longitudinal axis.
5. "Flip" is rotation about the lateral axis.
6. "Control" as in "roll control", "flip control", etc) is an input to command movement about the axis described, which may be from the user from a transmitter/receiver, but may also include input from sensors, except input from stabilizing gyros.
7. "PID" (proportional, integral, derivative) is input on Roll, Flip, or Yaw from stabilizing gyros.
8. "Rotor Pitch" is the angle of attack of the blades of each individual rotor.
9. "Collective Pitch" is an input (from user and/or sensors) which commands increasing or decreasing rotor pitch on all rotors to cause motion perpendicular to the plane of the rotors.
10. "Increase Pitch" means changing collective or rotor pitch in the direction such as to cause an upright machine to have an upward acceleration (or to cause an inverted machine to accelerate downward).
11. "Decrease Pitch" means changing collective or rotor pitch in the direction to cause an upright machine have acceleration downward (or to cause an inverted machine to accelerate upward).
12. "Mixing Unit" is the software calculation that produces the control information for the individual rotors from the complete set of Control and PID inputs.
13. "Force vector sensor" is something that determines the direction of force being applied to the body from the rotors. This includes sensors that measure pressure and hence imply airflow, sensors that measure the airflow itself such as a vane that pivots or moves pivots depending on the airflow impinging on it, and measurement of the direction (and possibly magnitude) of the force on individual rotors or on combinations of rotors. The control disclosures are not for the sensor(s), but rather for the use of the information from the sensors.

Figure 5:
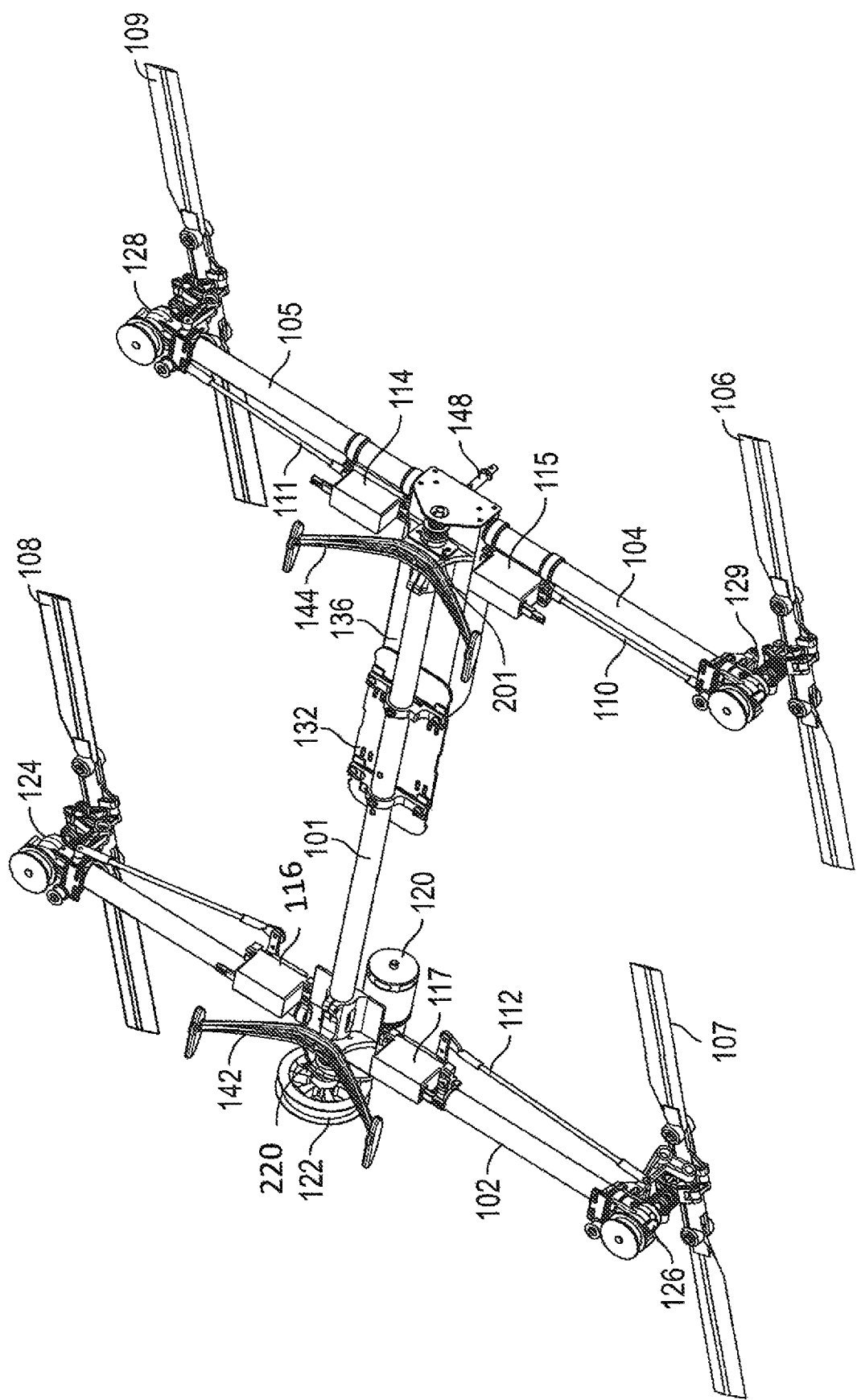
FIG. 5 is a bottom side perspective view of an embodiment of the invention.
Figure 6:
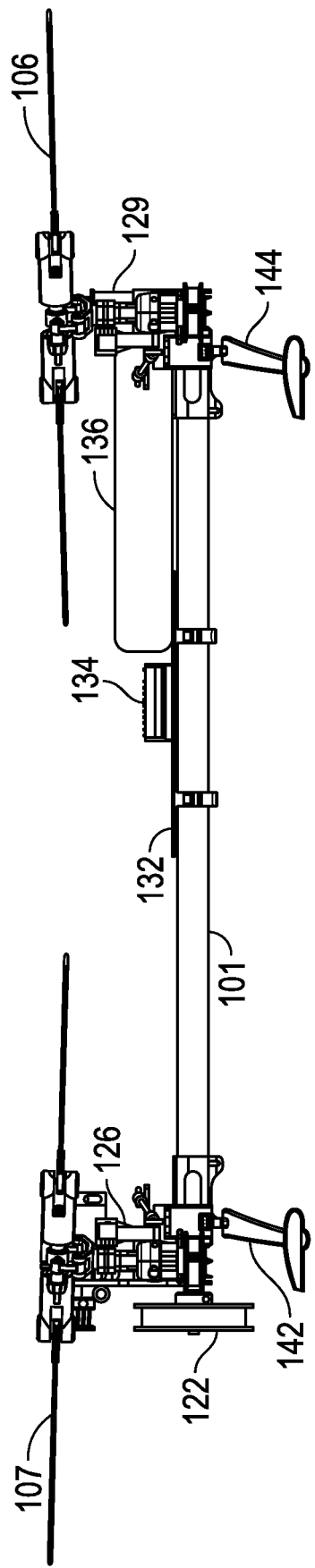
FIG. 6 is right side plan view of the embodiment of the invention shown in FIG. 1.

The Figures are illustrative of embodiments of the invention. Referring to the Figures, FIG. 1 is a perspective view showing a hollow center boom, 101, that carries the main drive shaft. Rotor legs, 102,103,104,105, extend from the center boom perpendicular to it and support the rotor bases, 124, 126, 128 and 129. The rotor bases as shown comprise a mechanical drive mechanism for the rotors 106, 107, 108, 109 and a pulley wheel for use with a drive belt (belt not shown) to rotate the rotors. The drive belts (FIG. 5) are fitted from drive wheel 220 to rotor drives in the rotor bases 124 and 126 at the motor end of the center boom and similarly for a drive wheel, 122, at the forward end of the center boom to connect to rotor drives 128 and 129. The power system (drive means), 120, (electric motor, Nitro, gas, turbine, etc. . . . ) drives the central shaft located in the hollow center boom that is attached to drive pulley 122. The drive wheel 20 and pulleys can be attached by pulley or gears to the pulleys of the rotor bases 124 and 126 (there is the same arrangement on the opposite end of the center shaft). The single drive shaft extending down the center boom, 101, transfers power either by belt or gear/shaft along the legs to the rotor bases. The centralize drive shaft provides the potential to drive multiple rotor systems from a single power source. It could be configured with 3, 4, 6, 8 or more rotors. Item 132 is a support member removably connected to the central boom 101, to support the radio control (RC) receiver (not included in drawings) and the flight control module 134. Item 136 is a cover for component and 148 is a post to support a canopy. Items 110, 111,112 and 113 are levers for adjusting the angle of the rotor bases. The RC receiver receives signals from a RC transmitter ((located on the ground and manipulated by a user (pilot)). The RC receiver modifies and cleans the signals received from the transmitter and passes the signals to the flight control module. The flight control module receives various inputs and sends appropriate signals to the motor(s) and servomotors 114, 115, 116 and 117 to control and adjust various functions of the craft. The transmitter to receiver system gives the user (pilot) remote control of the fight functions of the aircraft.

Figure 2:
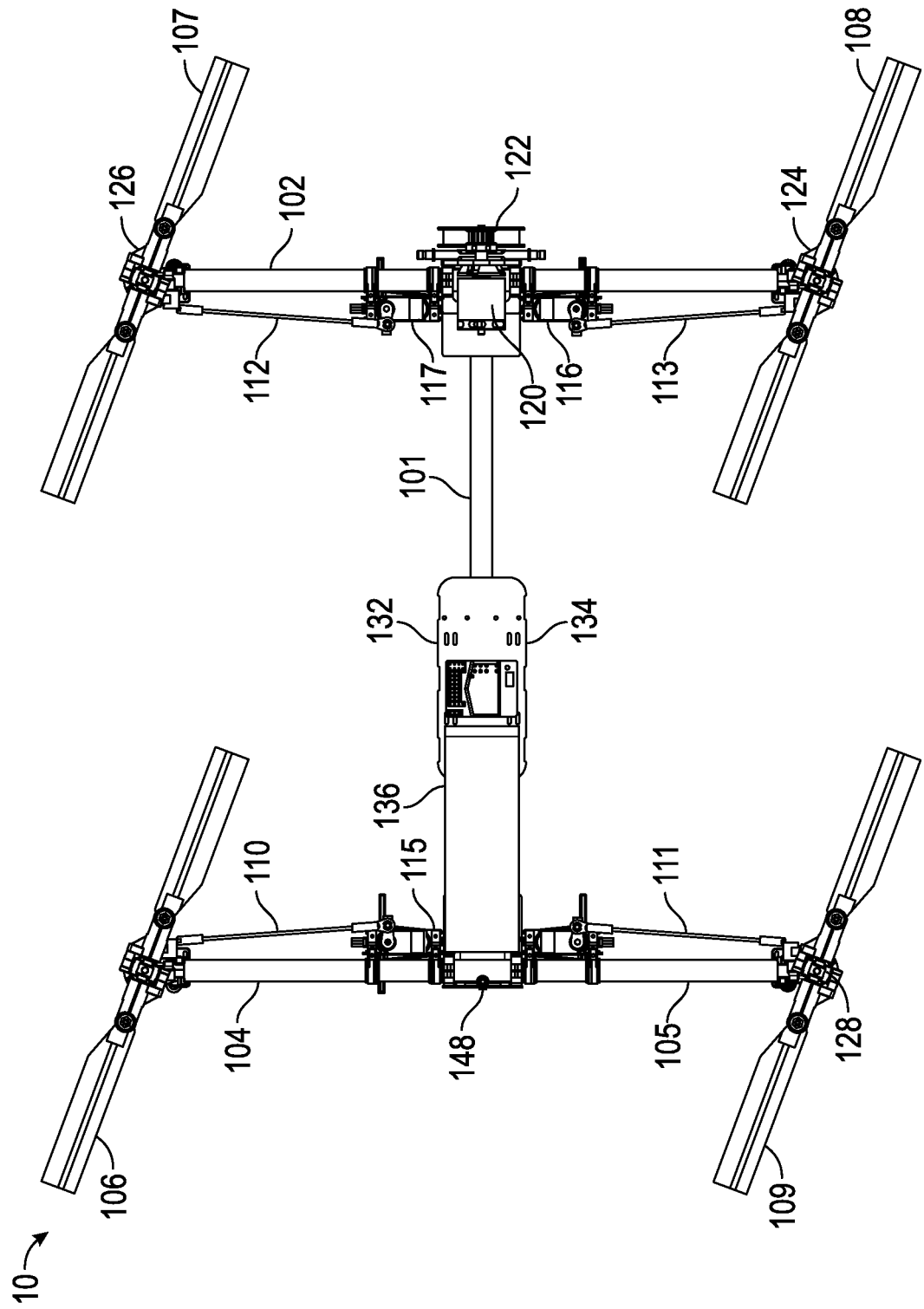
FIG. 2 is top plan view of the embodiment of the invention shown in FIG. 1.
Figure 3:
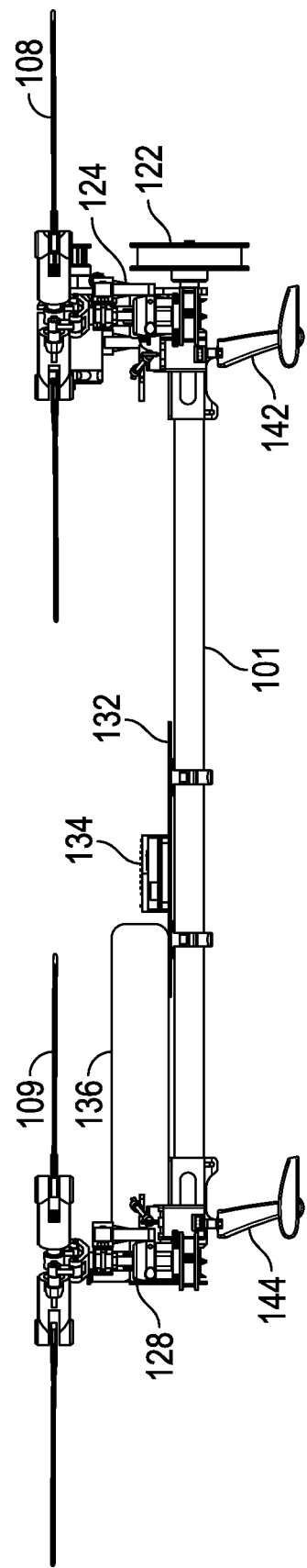
FIG. 3 is left side plan view of the embodiment of the invention shown in FIG. 1.
Figure 4:
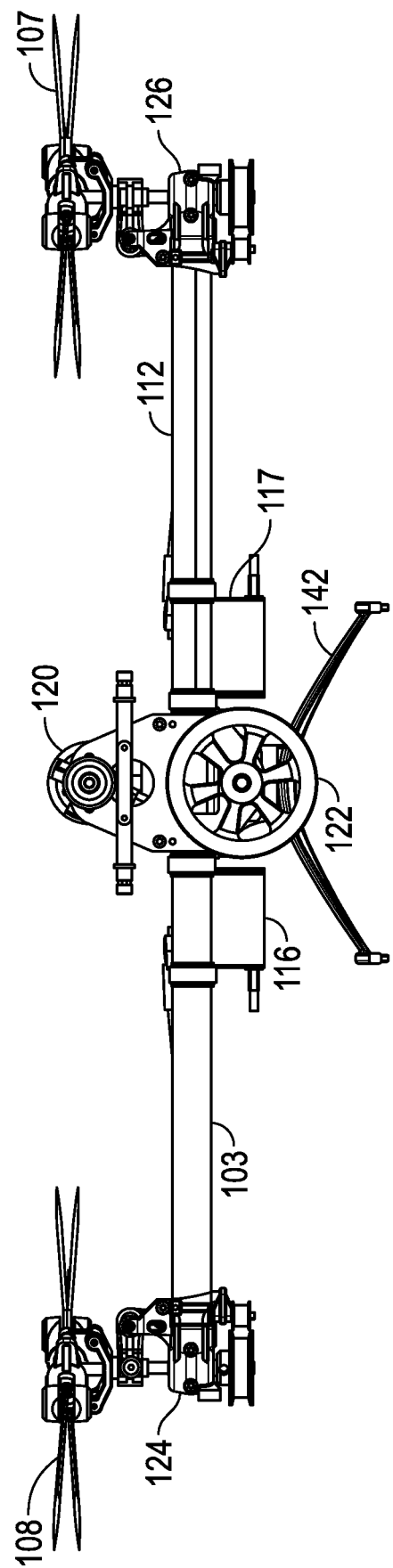
FIG. 4 is rear plan view of the embodiment of the invention shown in FIG. 1.

FIGS. 2-6 are other views of the aircraft of FIG. 1. FIG. 2 is a top plan view of the aircraft of FIG. 1 and FIG. 3 a side plan view. In FIGS. 1, 3, 4 and 5 the landing structures 42 and 144 are shown.

The center boom provides a lightweight and simple structure for attaching the rotor legs and for containing the drive shaft for transferring power. This design can accommodate a central drive system for single motor drive, dual motor drive or support a multi-motor drive system with motors on every leg/rotor base. The single central boom represents a simple to manufacture, simple to assemble, simple to maintain component design.

Tail Response—Flexible Frame

Figure 7:
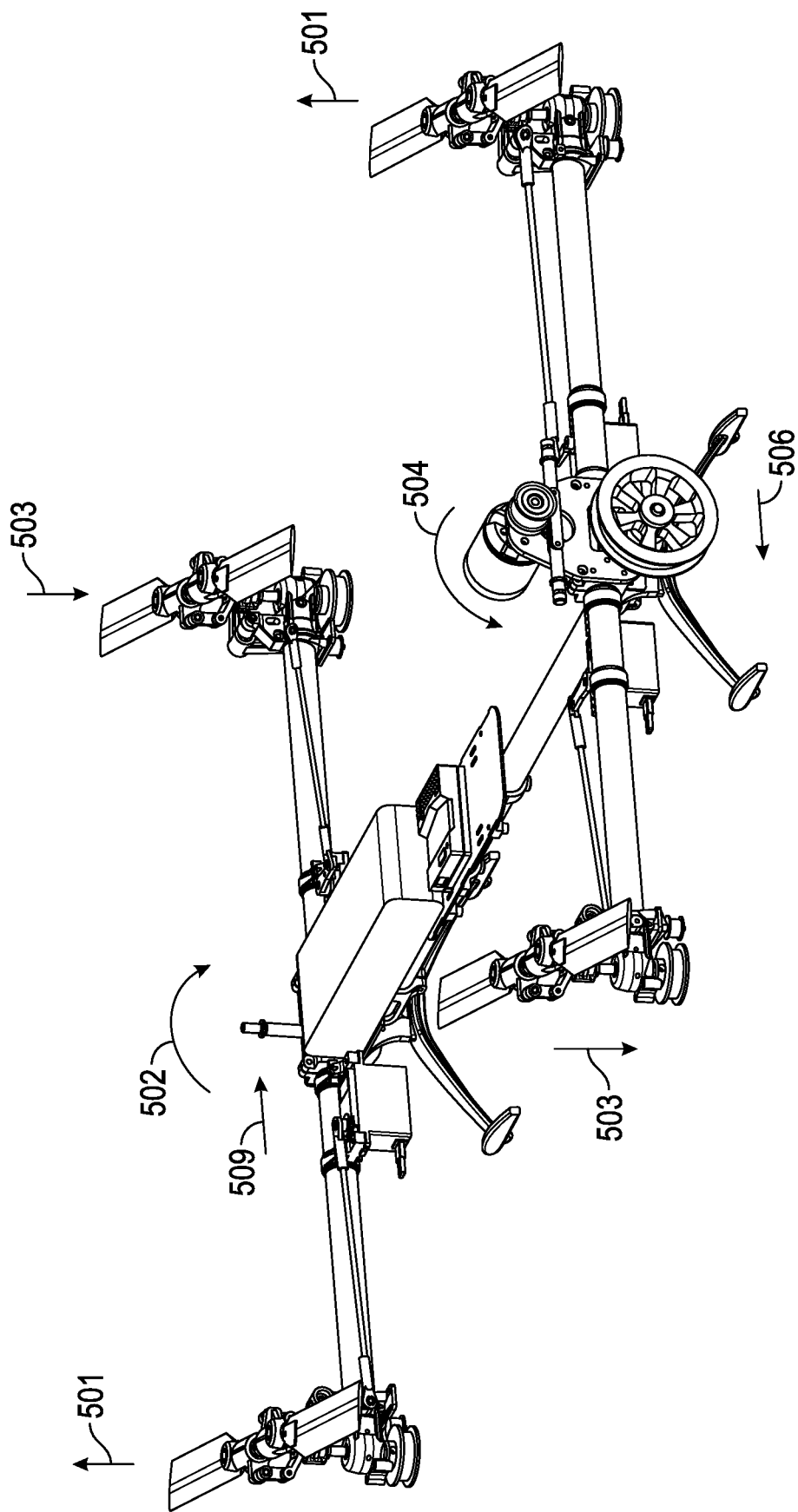
FIG. 7 is a top side perspective view of an embodiment of the invention showing varying flight directions in response to control and ambient conditions.

An advantage of the "H" frame design is that the frame is somewhat flexible in a manner that facilitates improved yaw response over that of conventional cross or "X" frame designs (rotor legs extending from a single center member). The arrangement of the rotor blade directions, which one is clockwise and which one is counterclockwise, is important in the performance. In the "H" design, rotation choices and the center boom result in improved yaw performance over other multi-rotors. The dimensions and materials and configuration of the "H" frame provides flexibility that allows some twisting of the front boom relative to the back boom through the center boom. FIG. 7 shows a right yaw input with the rotors going in the direction for best yaw performance. When using torque change to give a right yaw input the front left rotor increases lift (arrows 501). The front right rotor decreases lift (arrows 503). The right rear rotor increase lift, and the left rear rotor decreases lift. These rotor lift changes results in the torque changes that give right yaw based on torque alone. At the same time the two front rotors combine to twist the front in a right roll (arrow 502). The two rear rotors combine to twist the back in a left roll (arrow 504). This results in the front going right (arrow 508) and the back going left (arrow 506). This makes the machine spin around the center in the same way as a yaw input.

If the rotor directions were reversed, to give right yaw based on torque, then the arrows 501 and 503 would be reversed from the direction shown in FIG. 7. This would make the front twist left and the rear twist right and result in the twist from the lift to oppose the yaw input from torque balancing. This would reduce the performance of the yaw response.

A properly designed "H" frame can make the best use of this concept. An "X" frame does not flex in a controlled manner to emphasize the yaw input based on lift. And a completely rigid frame, while better than an incorrectly arranged rotor layout, would not be as good as an "H" frame with the proper level of flex and properly ordered rotor direction.

The arrangement of the rotor directions, which one is clockwise and which one is counterclockwise, is also important in the flight performance as well as the twisting of the front boom relative to the back boom through the center boom described above. The "H" frame design, the ability to change rotation choices and center boom result in an improved yaw performance over other quads and multi-rotors.

Tilted Rotor Bases and Blades—Leg Boom Pivot

The leg booms can be placed at different rotational angles to allow for different modes of flight, for example speed flying. The Leg booms 102, 103, 104 and 105 can be turned to give different rotational angles. The center boom body stays substantially flat with the rotor bases and blades tilted forward (from perpendicular). This will provide maximum speed. In other terms, in the layout shown in FIGS. 1-6 the leg booms sit so that the rotor shafts are perpendicular to the ground. The rotor bases are configured with the front and rear rotor bases (and therefore the rotor blades) tilted or pivoted forward or back. This is easily accomplished by rotating the rotor arms relative to the center boom. For example the rotor base shafts could be at about 70 degrees relative to the ground instead of 90 degrees as shown in the FIGS. 1-6. This gives an advantage in terms of forward speed. For a 90 degree layout to fly forward, the entire craft must be leaning forward about 30 degrees to obtain maximum speed. This exposes the top of the canopy and the mechanics of the craft to oncoming wind. With the rotors tilted (rotated) forward the mechanics sit closer to level with the ground/air and greatly reduces drag both on the body and the rotors. The "H" frame design makes rotating the leg booms very easy and is a unique feature of the design of this invention.

There are control characteristics for the tilted rotor design and for tilted rotor configurations with multiple motors (as described below). Whether multi motors or single motor, whether fixed at an angle or rotating, with the motors pivoted off of 90 degrees the axis of the body will no longer be on the control system axis. By rotating the rotors forward to achieve higher speed, the roll axis and rudder axis will interact so a pilot flying the machine and looking at the body will get an un-natural control feel. When the pilot gives a "roll" input the body will appear to roll and yaw. Also a Yaw input would result in what appears to be a "Yaw" and "Roll" response. These issues are addressed in this invention by a flight module control for automatic mixing between aileron and rudder response. When a pilot gives a roll control the flight module will give a proper mix of roll and yaw input to correct for the angle of rotation of the rotors. This will result in a "pure roll" relative to the body, instead of relative to the rotor blades. The level of the mix will change based on the level of tilt of the rotors from perpendicular.

Multiple Motors

In another aspect of the invention there are separate motors driving each rotor. Thus, a quad rotor of this invention will have a separate independently controlled motor for each rotor. There are some unique advantages for separate motors, including:

1.) Allows the use of motor RPM and collective pitch together to cause more aggressive and solid stops on Yaw. Both increases in RPM and increases in rotor blade pitch add torque to the rotor. To add extra torque the 4 motor variable pitch quad will employ both pitch changes and rotor RPM changes either separately or together to achieve the desired control. The combined control can be incorporated in many control schemes, involving simultaneous input of rotor RPM and pitch or varied application of one relative to the other for a desired control affect.

2.) Allows the alteration of rotor RPM around zero within a set range of collective to allow for drops through Zero pitch range to assist in a jump between a positive lift situation and a negative lift situation to avoid the "Bad Zone" around zero. The Pitch can be fixed at a set level such as 4 degrees and the RPM reduced to remove lift. This will reduce lift without a significant chance of lift reversal and torque reversal. The rotor RPM could also be reduced when the collective is transitioning from a set positive to a set negative to greatly reduce the negative effects of lift reversal around zero.

3.) Where pitch change is limited to efficient blades range, rotor RPM can be varied to retain large lifting control range. Pitch of the rotor system can be limited to the high efficiency range of a particular blade design. To help expand the total lift created with this limited pitch range the rotor RPM can be varied to increase or decrease lift in the important ranges. For example an efficient prop range of 4 degrees to 15 degree, and −4 to −15 degrees can be used for the variable pitch portion of the control. This in combination with the variable RPM to expand the lift range will result in a more efficient system and keep the rotor system further from stall in extreme flight.

4.) Allows increase rotor RPM at pitch extremes. When a variable pitch rotor reaches a control limit the range of lift can be expanded by increasing the RPM. This will increase the functional lift range of the machine in control situations especially when the control has maxed out but the angle of incoming air reduces the relative blade angle and reduces lift.

5.) In both the four motor and single motor configurations, the gain can automatically change, either up or down, in response to variations in rotor RPM. This helps maintain an ideal gain based on changes that occur with RPM. With a fixed gain, the overall gain would have to be set lower to account for the cases of high RPM and faster response times.

Landing Gear

Most conventional multi-rotors land on supports located under each individual rotor base. This requires a much larger landing base for secure landings and can result in leg damage in hard landings as the main mass of the craft is centered in the body. The landing gear of the present invention, 144 and 142, are located along the central boom, 101. The landing gear may be made from molded plastic, carbon, metal etc., and removably connects (as by bolting) to the central boom, 101, leg booms, 102, 103, 104 and 105, close to the center or coupling components between the legs and center boom. This location more directly supports the main weight of the craft. It can reduce structural damage in hard impacts on the landing gear. It also reduces the open landing area needed for a secure landing.

Canopy

Figure 15:
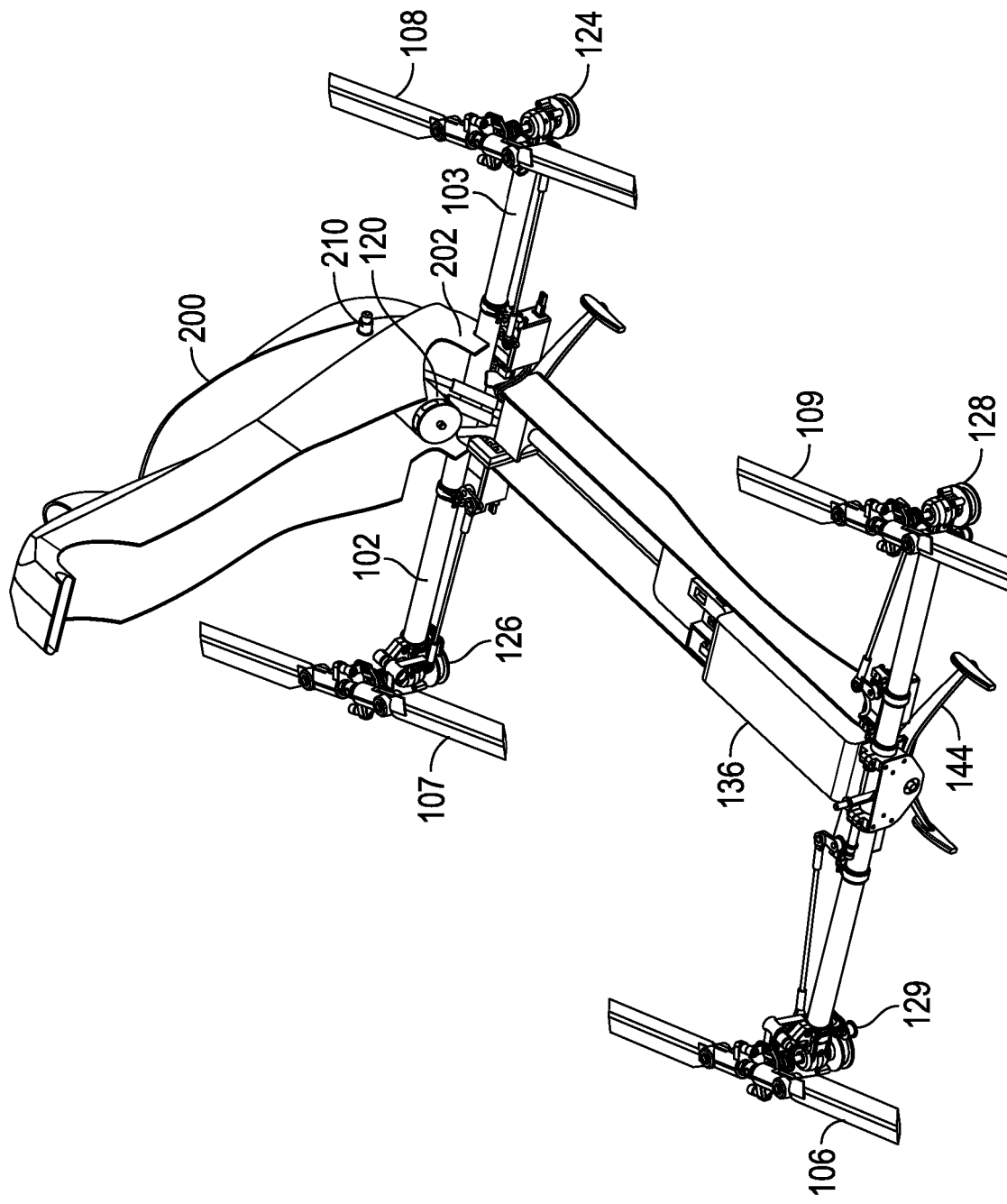
FIG. 15 is a perspective view of a canopy of an embodiment of the invention

A perspective view of an embodiment of a canopy is shown in FIG. 15. A canopy, (200 in FIG. 15) similar to a clam shell, in one embodiment (not shown in the FIGS. 1-6), pivots at the rear of the aircraft. As it pivots up a section, 202 (flap), of the canopy located at the rear of the canopy spreads to pass over the rotor arms 102 and 103 to latch the canopy in an open position. To lower the canopy, the contacting section of the canopy is spread to release the contact between 202 and 102/103 to allow the canopy to rotate back down into a closed position. A prototype was made of thin sheet polyethylene that is vacuum molded to the desired shape. The canopy is hinged by a pin (210) through the rear top 200. When the front is lifted the curved molded rear of the canopy provides a stop to prevent lifting more than desired—about 45 to 60 degrees from horizontal. The flap, 202, engage the rotor leg 102/103 when the canopy is lifted. To close, the flexible flap of the canopy is spread to release it from contact with the rotor arm.

Methods of Control of Flight Issues in Multi Rotor Aircraft

In another set of embodiments this invention is in methods of controlling certain flight characteristics and flight issues in multi rotor aircraft, particularly in aircraft with an "H" frame design, but also applicable to all multi rotor frame designs. Three issues relate to control of Yaw and another relates to problems that result when rotor mechanical limitations prevent adequate control. These solutions are, in some embodiments, electronically built into the computer components of the fight control module of this invention. They respond to input signals in a manner fixed by the functions as described hereinafter. Design and assembly of the electronics of the control module board to achieve the function disclosed is well within the skill of the art. To better understand and define the solution to these control problems refer to the definitions of terms above.

Flight Issues with Yaw

Yaw is determined by the relative torque of sets of counter-rotating rotors. If the torques of two sets of rotors is equal, there is no acceleration about the yaw axis. Increasing the lift of one set of rotors increases the torque of that set and causes a yaw in a direction opposite of the rotation of the higher torque rotors. A pure yaw control is accomplished by increasing the lift (and hence torque) of one set of rotors while decreasing the lift (and hence torque) of the other set. When rotor pitch is positive, an increase of lift and torque is accomplished by increasing the pitch, while a decrease in lift and torque is accomplished by decreasing pitch. However, when rotor pitch is negative, lift is reversed and a decrease in pitch increases the magnitude of the lift and the torque, while an increase in pitch decreases the magnitude of the lift and the torque. The rotor pitch must be moved in one direction for a given yaw direction when blade pitch is positive, but must be moved in the opposite direction to accomplish the same yaw if the blade pitch is negative. This has the effect of reversing yaw control (and PID) direction when the rotor pitch goes through 0°. This reversing can occur during any type of control input, collective, roll, pitch or yaw.

Methods to Fix Reversal of Yaw Control/PID Direction:

Program Solution #1.

Figure 8:
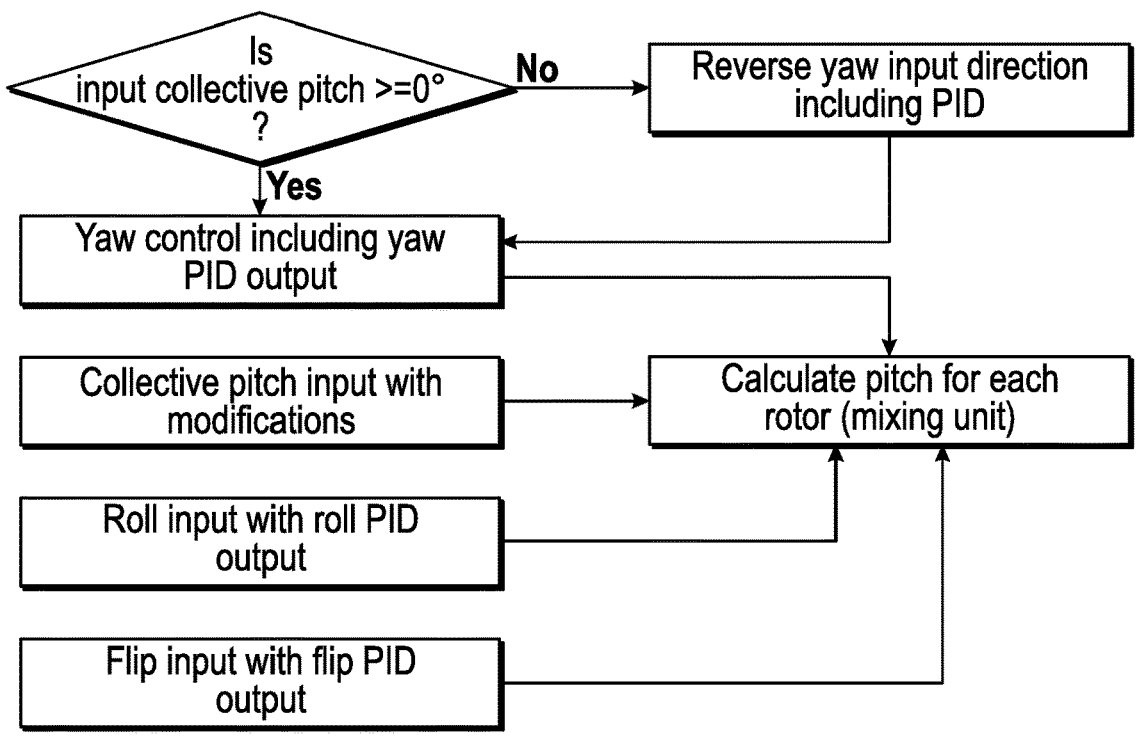
FIG. 8 is a schematic of functions of a programmed control mode of the invention.
Figure 8A:
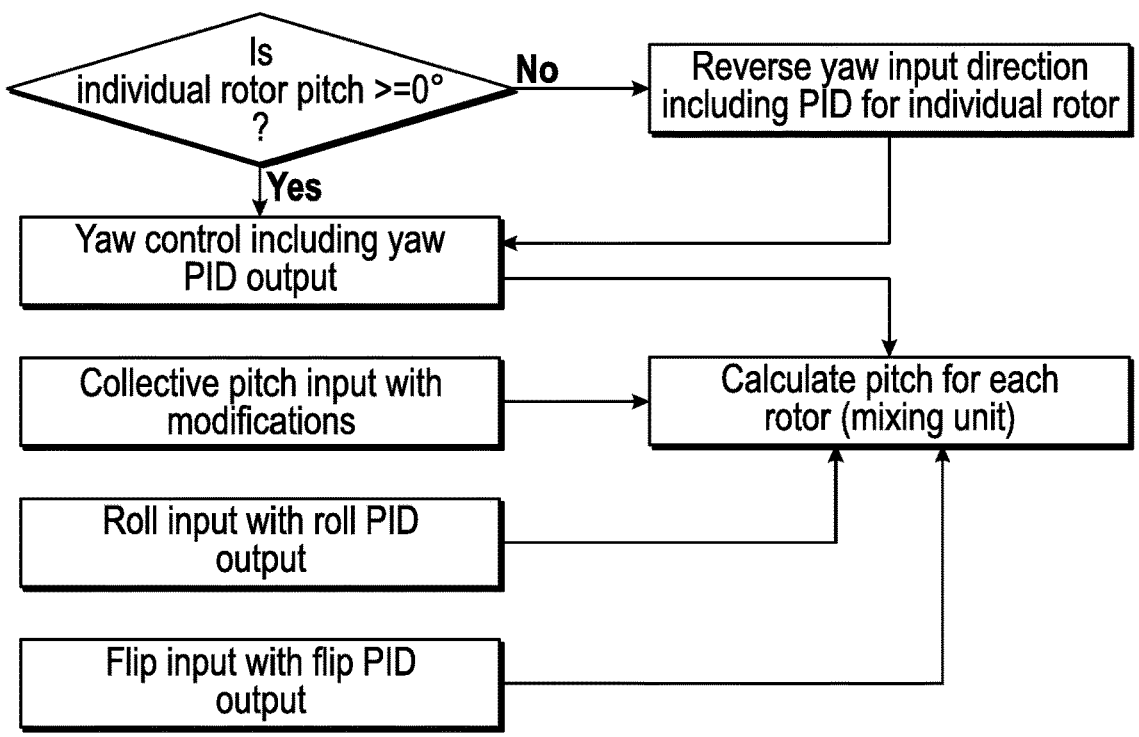
Figure 9:
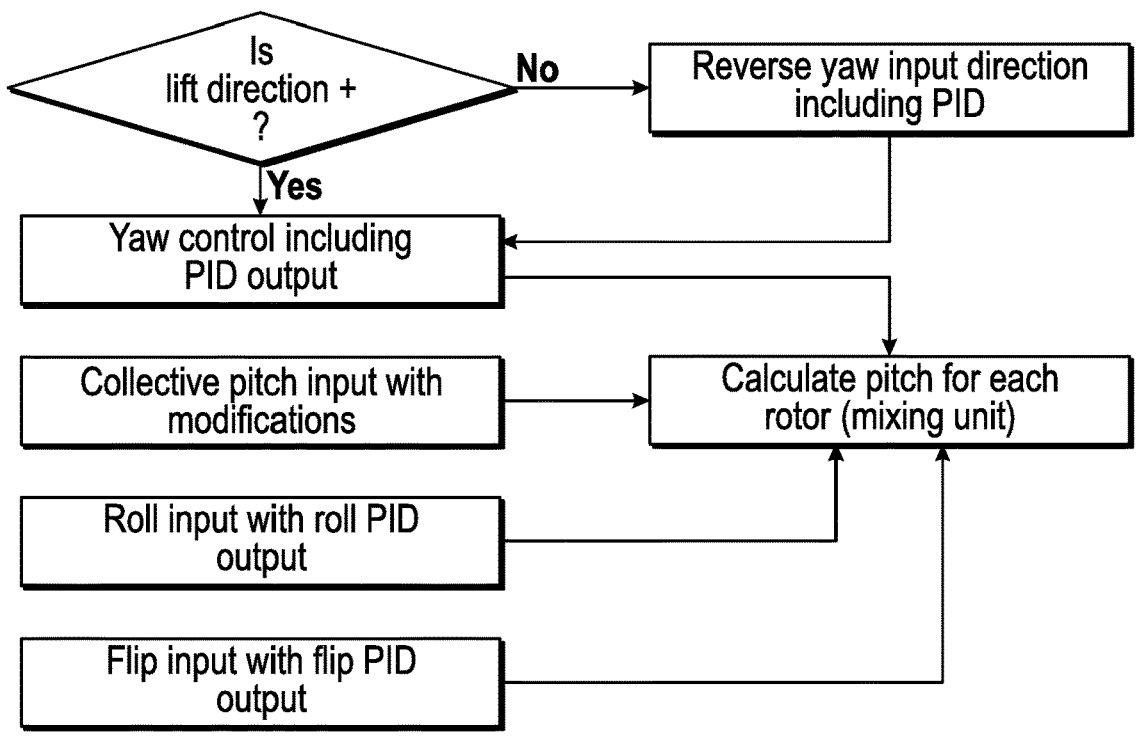
FIG. 9 is a schematic of functions of a programmed control mode of the invention.

To allow proper yaw control as the direction of torque response from the rotor reverses, the yaw control/PID direction must be reversed. This can be accomplished by three methods (a), (b) and (c), FIG. 8, 8A and FIG. 9 below, used individually or together.
  (a) The yaw direction is reversed as the input collective pitch goes from positive through zero to negative by the steps shown in FIG. 8.
  (b) The yaw direction is reversed as the pitch for the individual rotor goes from positive through zero to negative by the steps shown in FIG. 8A.
  (c) Measure lift force direction (+ or −) through rotor(s), using some form of force vector sensor. Use this information to sense reversal of lift on rotor and reverse yaw control including PID as shown in FIG. 9.

Program Solution #2.

When operating with Rotor Pitch close to 0°, a yaw command that increases the pitch (and torque) of one set of rotors and decreases the pitch (and torque) of the other set of rotors can cause the pitch of one set of rotors to go through zero and begin increasing torque as the pitch further decreases. For example, if the collective pitch of the system is slightly positive, the two rotors going positive will increase torque as yaw is commanded, while the two rotors going negative will decrease (opposing) torque until they reach 0°, which increases the net torque that yaws the machine. However, as yaw command is further increased, the set of rotors having negative collective will increase torque, reducing the net torque available to yaw the machine. The effect is for the yaw to increase as yaw command is increased until the set of rotors go negative, then for the yaw to DECREASE as the yaw command is further increased, leading to an significant reduction in yaw performance.

Figure 10:
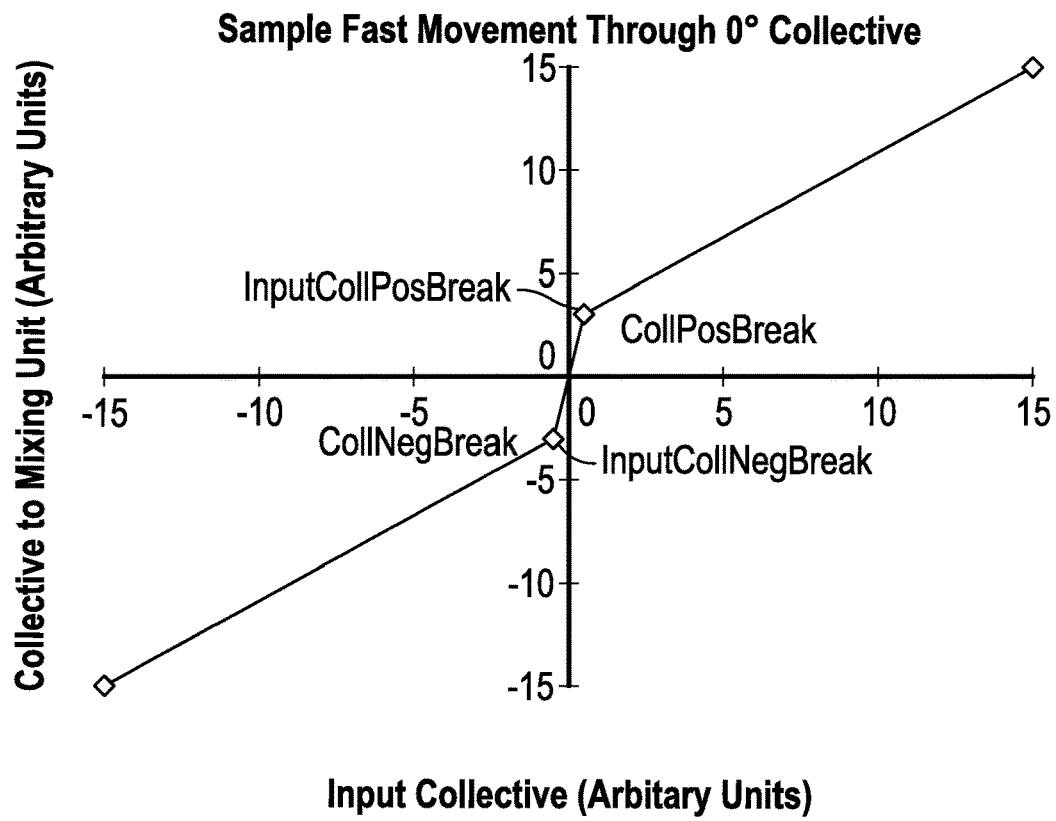
FIG. 10 is a graph showing relationships used in a programmed control mode of the invention
Figure 11:
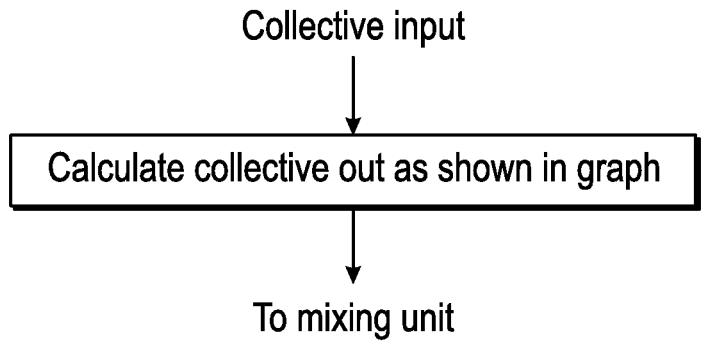
FIG. 11 is a schematic of functions of a programmed control mode of the invention using the relationships of FIG. 10.

To reduce the likelihood of operating in the region of collective pitch where this yaw reversal occurs and hence improve the flying experience for the user, the collective sent to the mixing unit is moved rapidly from positive collective to negative collective with a small smooth change in collective control as shown in FIGS. 10 and 11. FIG. 10 is a Schematic graph showing the collective output to the mixing unit vs. input collective pitch control. The paths shown as straight lines between the diamonds may also be curves with smooth or sudden transitions at the two inside diamonds.

CollPosBreak is the value of the Collective sent to the mixing unit when the fast transition begins (or ends) with positive Collective. CollNegBreak is the corresponding value for negative collective. InputCollPosBreak is the input collective at which this break occurs for positive collective. InputCollNegBreak is the corresponding point for negative collective. These values may be fixed in the code, set by the user, or other party.

Program Solution#3.

Figure 12:
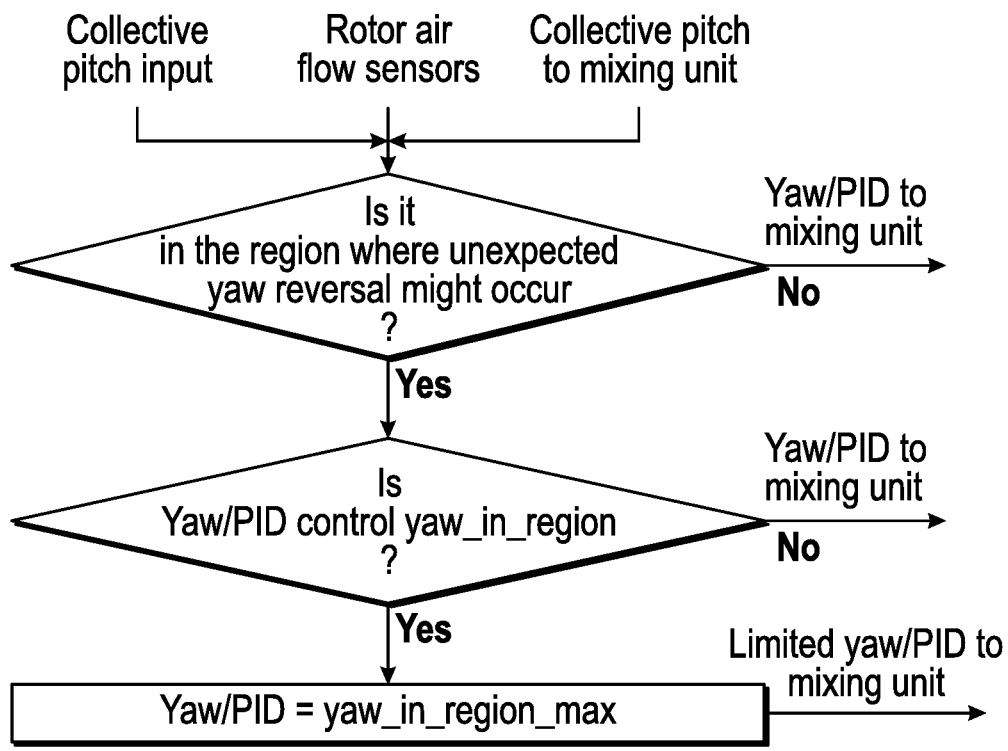
FIG. 12 is a schematic of functions of a programmed control mode of the invention.

As collective pitch nears 0°, the relative motion of rotors and air can cause lift reversal to occur on one or more rotors at non zero rotor pitch. The resulting lift reversal causes the torque response to a yaw command (Control and/or PID) to move the rotor pitch in the wrong direction, leading to a momentary loss of or incorrect yaw response. If there is substantial yaw being commanded, this lift and torque reversal can cause a sudden large yaw as the yaw response is momentarily reversed at non zero rotor pitch. The solution is to limit the total amount of yaw command when in the flight region where such reversal is likely to occur using the steps of FIG. 12.

Flight Issues with Control Limits

If a control or PID input causes one or more rotors to reach a mechanical limit before attaining the appropriate rotor pitch or to have excessive rotor pitch where the blades stall, a completely unintended motion can be caused. For example, a Yaw command could cause one rotor to stall or reach a mechanical limit while the other rotors continue to change pitch as instructed. This can result in roll and/or flip, and/or collective pitch motion as a result of a yaw input. To determine when the rotors are in the region where this reversal is likely to occur, several things may be monitored separately or in combination: Collective Pitch Input from user, Collective Pitch input to mixing unit, Airflow sensors on rotors, Lift sensors, etc.

There are two solutions, A and B, used independently or together.

(a) Solution A.

Figure 13:
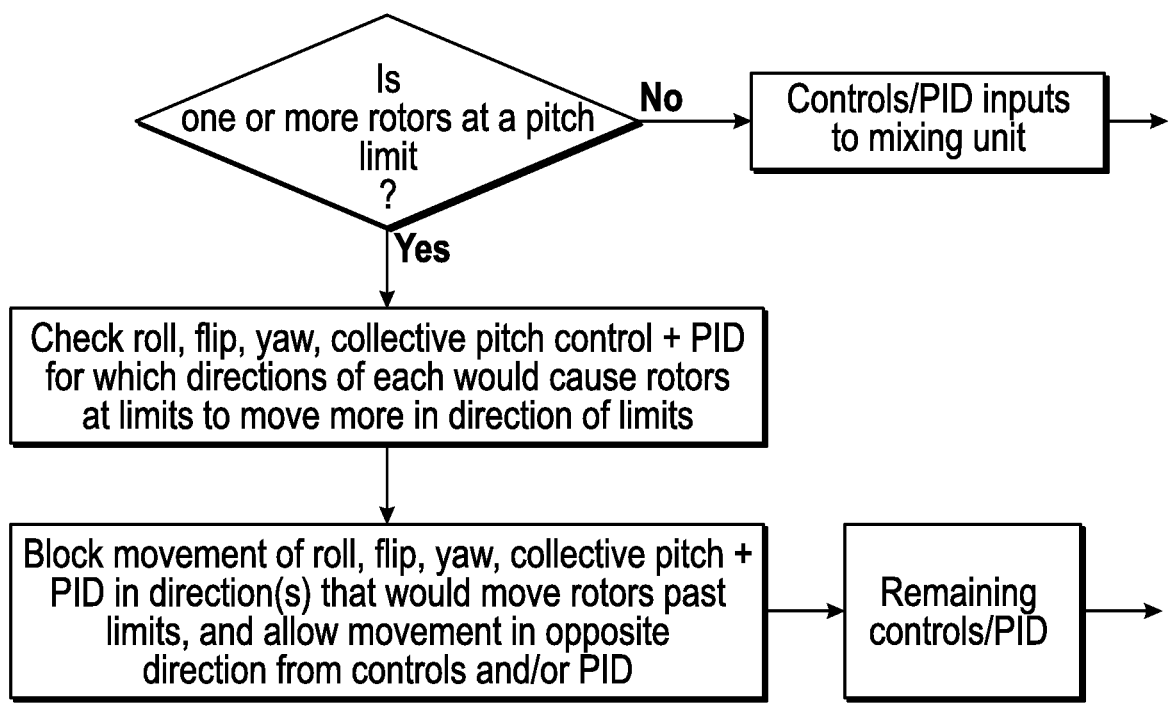
FIG. 13 is a schematic of functions of a programmed control mode of the invention.

Once the rotor pitch of any one (or more rotors) reaches a limit (set in software or by mechanical or electrical determination of position), control to the other rotors is limited on the input functions (roll, flip, yaw, collective pitch) and PID in that direction. But controls, including PID, in directions which would not move to the rotor limits would move normally. The functions are shown in Schematic FIG. 13.

(b) Solution B.

Figure 14:
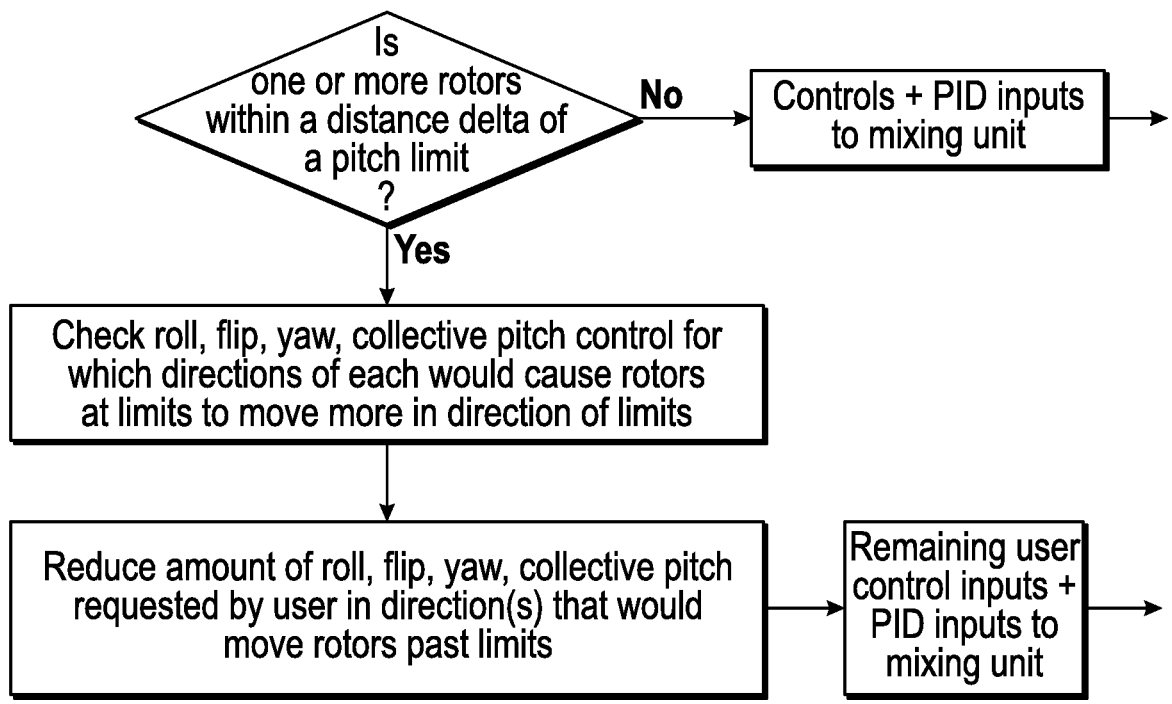
FIG. 14 is a schematic of functions of a programmed control mode of the invention.

When the rotor pitch of any one (or more) rotors is near a limit (set in software or by mechanical or electrical determination of position), any control input that moves those rotors (the ones at or past the "near limit") closer to their limits is reduced significantly so that the user sees a significant "slowdown" in response and can know that some rotors are approaching their limit, and can respond accordingly. PID inputs to the rotors are NOT included in this "slowdown". The functions are shown in Schematic FIG. 14.

Other Control Issue and Programmable Solutions

Gyro Issues on Takeoff

The flight control uses sensors to determine the motion of the aircraft. The flight control does various calculations based on the sensor information. One component of the sensor information is the "rate" component of movement. The rate component is a fast response to specific movement. One calculated component is the "Heading" component. The heading component is slower and is an integration of the rate component over time and works to put the machine at a specific orientation. When on the ground the machine is not able to move, but if the heading component gain is active and the sensors indicate even a tiny movement whether real or in error, the flight control can try to move the machine by adding a large amount of control. As the machine sits on the ground, unable to move in response to control, this control builds up. Once the machine lifts off, the large buildup of control can cause unexpected violent movement of the machine.

There are two solutions, A and B, used independently or together.

A. Use throttle position, RPM and or Altitude to Switch on the heading component of the control after a safe takeoff. To avoid this it is possible to keep Rate gain only on while on the ground, and turn on heading gain once in the air. With heading gain turned off there would not be a buildup of control on the ground. There are many triggers that can be used to trigger the heading component. Throttle position, rotor RPM, altitude, etc. can all be used as a trigger to switch heading gain on after a safe takeoff. This can be programmed into the flight control module or controlled remotely by input through the RC transmitter and RC receiver.

B. Take-Off control to monitor heading to determine drift issues before liftoff for safety. Sometimes sensors do not initiate properly and can drift making the controller think it is moving when it is not. This can result in dangerous responses on takeoff and during flight. As a safety feature a controller is provided that automatically monitors drift as the throttle is raised in preparation for takeoff, based on several optional triggers, including, throttle, RPM, gain, etc. The motor can be delayed if needed relative to throttle position or other triggers to allow for monitoring before the machine is at an RPM sufficient for the machine to fly. If there is a sensor drift problem the control will pulse or control inputs held, throttle held to a low value or other. This acts as a warning to the pilot to stop and either reset the unit or determine the problem. This too can be programmed into the flight control module and controlled remotely by input through the RC transmitter and RC receiver.

Car Mode Operation

To control the multi-rotor or any rotor craft the pilot normally interfaces with the machine using 4 main controls and an Aux Channel Switch. Commonly called Roll, Pitch, Yaw, Collective/Throttle. With these controls the pilot controls all the aspects of flight. In addition the pilot often uses "Aux channel" switches to change between different flight modes, for example, hover or Stunt mode. In "Car mode" the control in the interface between the pilot and machine is reduced to two main controls "Throttle" and "Steering" and an Aux Channel. In this case the "throttle" controls the relative speed of the machine and "Steering" controls the direction the machine is facing. The relative application of Steering and Throttle results in relative movement of the aircraft to "simulate" the actions of a car as near as possible including actions like turning, stopping, reversing, etc. The altitude and general stability of the machine is controlled by a combination of sensors and the flight control. An "Aux Channel" switch is then used to control takeoff and landing in addition to altering altitude. The result is a control of a flying machine with the same basic controls as an RC car.

Landing Mode

In one control application there is provided a control to facilitate landings that is usable in both single motor configurations and in multi-motor configurations. A switch is provided, controllable by remote control through the RC receiver and flight control module to initiate landing mode. The controller in the flight control module uses a combination of sensors, for example altitude, motion, GPS, etc. The controller reduces collective to initiate descent. As the machine gets closer to the ground if the descent rate is acceptable the pitch remains the same and the motor(s) RPM is slowly reduced to a set level to allow for the machine to settle slowly to the ground. This gives machine controlled landing without altitude input from the pilot. This can be used separately or together with position hold functions to control the machine landings.

In the foregoing specification, the invention has been described with reference to specific embodiments thereof. It will, however, be evident that various modifications and changes can be made within the spirit and scope of the invention as will be apparent to those skilled in the art from this description and by practice of the invention without departing from the broader spirit and scope of the invention as set forth in the appended claims. The scope of the invention is not intended to be limited to the particular forms disclosed and the invention covers all modifications, equivalents, and alternatives falling within the spirit and scope of the invention as defined by the claims. The specification is, accordingly, to be regarded in an illustrative rather than a restrictive sense. Therefore, the scope of the invention should be limited only by the appended claims.

The invention claimed is:

1. A method for controlling the flight of a multi-rotor aircraft having separate drive means for each rotor, each drive means being capable of separate control of rotor rpm and rotor blade pitch to achieve desired flight control effects; the method comprising:
(I) an operator inputting commands to a multi-rotor aircraft control unit as control input,
(II) the control unit processing the control input in at least one control module board, and
(III) the control unit providing a resulting control output for at least three rotors; and
wherein:
(1) the multi-rotor aircraft has a yaw direction, a roll direction, a flip direction, the rotors have a collective pitch, and each rotor has an individual rotor pitch;
(2) the control input to the control unit comprises yaw input, roll input, flip input, and collective pitch input;
(3) the control output comprises individual rotor pitch control output, and provides at least yaw control, roll control, flip control, and collective pitch control of the multi-rotor aircraft;
(4) the control module board comprises at least one mixing unit, and the control module board calculates individual rotor pitch for each rotor in the at least one mixing unit;
(5) the control module board comprises at least one gyro, and receives from the at least one gyro proportional, input, derivative (PID) input comprising yaw PID input, roll PID input, and flip PID input;
(6) the at least one mixing unit receives from the control module board at least: (i) yaw control output, including yaw PID output, (ii) roll control output, including roll PID output, (iii) flip control output, including flip PID output, and (iv) collective pitch output;
(7) the control module board is configured to minimize operation in a region of collective pitch close to zero, where yaw performance is reduced as at least one individual rotor pitch crosses zero, by receiving the collective pitch input and generating therefrom the collective pitch output according to a relationship comprising a rapid transition region, wherein the rapid transition region is defined by at least two breakpoints marking a beginning and ending thereof, and wherein the collective pitch output moves rapidly between a positive collective pitch and a negative collective pitch within the rapid transition region with a relatively small, smooth change; and
(8) the control module board is further configured to perform at least one of:
(a) preventing undesired reversal of the yaw control, as a rotor torque response direction reverses, by reversing direction of the yaw control input, including the yaw PID input, when the collective pitch input is less than zero, thereby providing a corrected yaw control output, including yaw PID output, to the at least one mixing unit which calculates therefrom individual rotor pitch control output;
(b) preventing undesired reversal of the yaw control, as a rotor torque response direction reverses, by reversing direction of the yaw control input, including the yaw PID input, for an individual rotor, when the individual rotor pitch is less than zero, thereby providing a corrected yaw control output, including yaw PID output, to the at least one mixing unit which calculates therefrom individual rotor pitch control output;
(c) further receiving input from at least one force vector sensor, preventing undesired reversal of the yaw control, as a rotor torque response direction reverses, by (i) receiving from the at least one force vector sensor a lift force direction, being positive or negative, and (ii) reversing direction of the yaw control input, including the yaw PID input, when the lift force direction reverses, thereby providing a corrected yaw control output, including yaw PID output, to the at least one mixing unit which calculates therefrom individual rotor pitch control output.

2. The method of claim 1 wherein the control board is provided with a Car mode of operation wherein:
(i) an operator interfaces with the control unit using two main controls and an Aux Channel switch;
(ii) the two main controls correlate to "Throttle" and "Steering";
(iii) "Throttle" controls a relative speed of the machine;
(iv) "Steering" controls a direction the machine is facing;
(v) relative application of "Steering" and "Throttle" by the operator results in relative movement of the aircraft to simulate actions of a car including turning, stopping, and reversing;
(vi) altitude and general stability of the machine is controlled by a combination of sensors and internal flight control;
(vii) the Aux Channel switch is used to control takeoff and landing and to alter altitude.

3. The method of claim 1 wherein the control module board is further configured to at least perform (8)(a).

4. The method of claim 1, wherein the control module board is further configured to perform further receiving input from at least one rotor air flow sensor, and preventing undesired yaw response, or loss of yaw response, in a region of collective pitch near zero in which relative motion of rotors and air can cause lift reversal to occur on at least one rotor that has non-zero individual rotor pitch, by: (i) evaluating the collective pitch input, the input from the at least one rotor air flow sensor, and the collective pitch output, to determine when the multi-rotor aircraft is in the region of collective pitch near zero, (ii) when (i) is true, evaluating whether the yaw control, including the yaw PID output, is within a predefined region, and (iii) when both (i) and (ii) are true, limiting the yaw control output, including yaw PID output, to a predefined maximum.

5. The method of claim 1, wherein the control module board is further configured to perform at least one of:
(d) preventing unintended motion of the multi-rotor aircraft by, when at least one rotor reaches a pitch limit, checking at least the roll control input, the roll PID input, the flip control input, the flip PID input, the yaw control input, the yaw PID input, and the collective pitch control input, and blocking all thereof that would move the at least one rotor past the pitch limit; and
(e) preventing unintended motion of the multi-rotor aircraft by, when at least one rotor is within a predefined range near a pitch limit, checking at least the roll control input, the flip control input, the yaw control input, and the collective pitch control input, and reducing all thereof that would move the at least one rotor past the pitch limit.

6. A multi-rotor aircraft control unit, the control unit comprising a control module board configured to receive control input, configured to provide resulting control output for at least three rotors, and wherein:

(1) the control unit is used for at least one multi-rotor aircraft, which has a yaw direction, a roll direction, a flip direction, the rotors have a collective pitch, and each rotor has an individual rotor pitch;

(2) the control input to the control unit comprises yaw input, roll input, flip input, and collective pitch input;

(3) the control output comprises individual rotor pitch control output, and provides at least yaw control, roll control, flip control, and collective pitch control of the multi-rotor aircraft;

(4) the control module board comprises at least one mixing unit, and the control module board calculates individual rotor pitch for each rotor in the at least one mixing unit;

(5) the control module board comprises at least one gyro, and receives from the at least one gyro proportional, input, derivative (PID) input comprising yaw PID input, roll PID input, and flip PID input;

(6) the at least one mixing unit receives from the control module board at least: (i) yaw control output, including yaw PID output, (ii) roll control output, including roll PID output, (iii) flip control output, including flip PID output, and (iv) collective pitch output;

(7) the control module board is configured to minimize operation in a region of collective pitch close to zero, where yaw performance is reduced as at least one individual rotor pitch crosses zero, by receiving the collective pitch input and generating therefrom the collective pitch output according to a relationship comprising a rapid transition region, wherein the rapid transition region is defined by at least two breakpoints marking a beginning and ending thereof, and wherein the collective pitch output moves rapidly between a positive collective pitch and a negative collective pitch within the rapid transition region with a relatively small, smooth change; and (8) the control module board is further configured to perform at least one of:

(a) preventing undesired reversal of the yaw control, as a rotor torque response direction reverses, by reversing direction of the yaw control input, including the yaw PID input, when the collective pitch input is less than zero, thereby providing a corrected yaw control output, including yaw PID output, to the at least one mixing unit which calculates therefrom individual rotor pitch control output;

(b) preventing undesired reversal of the yaw control, as a rotor torque response direction reverses, by reversing direction of the yaw control input, including the yaw PID input, for an individual rotor, when the individual rotor pitch is less than zero, thereby providing a corrected yaw control output, including yaw PID output, to the at least one mixing unit which calculates therefrom individual rotor pitch control output; and (c) further receiving input from at least one force vector sensor, preventing undesired reversal of the yaw control, as a rotor torque response direction reverses, by (i) receiving from the at least one force vector sensor a lift force direction, being positive or negative, and (ii) reversing direction of the yaw control input, including the yaw PID input, when the lift force direction reverses, thereby providing a corrected yaw control output, including yaw PID output, to the at least one mixing unit which calculates therefrom individual rotor pitch control output.

7. The control unit of claim 6 wherein the multi-rotor aircraft comprises a center boom from which extends three or more leg booms, the leg booms being disposed substantially perpendicular to the center boom, and on each leg boom is mounted a rotor base that has a rotor rotation means and rotor blades; the multi-rotor aircraft also comprising:

a drive means capable of connection to rotor rotation means on the rotor bases to rotate rotor blades; and servomotors that are connected to and function to control rotor blade pitch capable of receiving signals from the control unit.

8. The control unit of claim 7 wherein:

(i) the multi-rotor aircraft also has a plurality of drive shafts; and (ii) the rotor rotation means for each rotor comprises a motor connected to a separate drive shaft.

9. The control unit of claim 7 wherein the servomotors are capable of receiving signals from the control unit and wherein the servomotors are connected to and function to control rotor blade pitch angle.

10. The control unit of claim 6, being further configured with a Car mode of operation wherein:

(i) an operator interfaces with the control unit using two main controls and an Aux Channel switch;

(ii) the two main controls correlate to "Throttle" and "Steering";

(iii) "Throttle" controls a relative speed of the machine;

(iv) "Steering" controls a direction the machine is facing;

(v) relative application of "Steering" and "Throttle" by the operator results in relative movement of the aircraft to simulate actions of a car including turning, stopping, and reversing;

(vi) altitude and general stability of the machine is controlled by a combination of sensors and internal flight control; and (vii) the Aux Channel switch is used to control takeoff and landing and to alter altitude.

11. The control unit of claim 6 wherein the control module board is further configured to at least perform (8)(a).

12. The control unit of claim 6, wherein the control module board is further configured to perform further receiving input from at least one rotor air flow sensor, and preventing undesired yaw response, or loss of yaw response, in a region of collective pitch near zero in which relative motion of rotors and air can cause lift reversal to occur on at least one rotor that has non-zero individual rotor pitch, by: (i) evaluating the collective pitch input, the input from the at least one rotor air flow sensor, and the collective pitch output, to determine when the multi-rotor aircraft is in the region of collective pitch near zero, (ii) when (i) is true, evaluating whether the yaw control, including the yaw PID output, is within a predefined region, and (iii) when both (i) and (ii) are true, limiting the yaw control output, including yaw PID output, to a predefined maximum.

13. The control unit of claim 6, wherein the control module board is further configured to perform at least one of:

(d) preventing unintended motion of the multi-rotor aircraft by, when at least one rotor reaches a pitch limit, checking at least the roll control input, the roll PID input, the flip control input, the flip PID input, the yaw control input, the yaw PID input, and the collective pitch control input, and blocking all thereof that would move the at least one rotor past the pitch limit; and (e) preventing unintended motion of the multi-rotor aircraft by, when at least one rotor is within a predefined range near a pitch limit, checking at least the roll control input, the flip control input, the yaw control input, and the collective pitch control input, and reducing all thereof that would move the at least one rotor past the pitch limit.

\* \* \* \* \*